(12) United States Patent
Takizawa (10) Patent No.: US 7,825,980 B2
(45) Date of Patent: Nov. 2, 2010

(54) ELECTRONIC DEVICE, DISPLAY METHOD THEREOF, AND STORAGE MEDIUM STORING PROGRAM FOR EXECUTING THE METHOD

(75) Inventor: Junichi Takizawa, Yokohama (JP)

(73) Assignee: Samsung Electronics Co., Ltd., Suwon-si (KR)

( * ) Notice: Subject to any disclaimer, the term of this patent is extended or adjusted under 35 U.S.C. 154(b) by 485 days.

(21) Appl. No.: 11/604,988

(22) Filed: Nov. 27, 2006

(65) Prior Publication Data
US 2007/0146527 A1 Jun. 28, 2007

(30) Foreign Application Priority Data
Dec. 26, 2005 (JP) ............................. 2005-372847

(51) Int. Cl.
*H04N 5/222* (2006.01)
(52) U.S. Cl. .......................... 348/333.12; 348/333.01; 348/333.11

(58) Field of Classification Search ................. 348/312, 348/341, 333.12, 333.01, 333.11
See application file for complete search history.

(56) References Cited

U.S. PATENT DOCUMENTS

| 5,767,921 A | * | 6/1998 | Shyu | ........................... 348/578 |
| 2001/0005231 A1 | * | 6/2001 | Kubo | ........................ 348/341 |

FOREIGN PATENT DOCUMENTS

JP 11-187356 A 7/1999

* cited by examiner

*Primary Examiner*—David L Ometz
*Assistant Examiner*—Antoinette T Spinks
(74) *Attorney, Agent, or Firm*—Drinker Biddle & Reath LLP (57) ABSTRACT

An electronic device for allowing a viewer to view still pictures according to the intention of a photographer or drafter of the still pictures when the still pictures are successively displayed, a display method thereof, and a storage medium storing a program for executing the method. The electronic device includes an estimation unit that estimates a level of adaptation of a viewer caused by a first picture displayed and a picture adjustment unit adjusting a second picture based on the estimated level of adaptation when the second picture is displayed subsequently to the first picture.

13 Claims, 5 Drawing Sheets

ELECTRONIC DEVICE, DISPLAY METHOD THEREOF, AND STORAGE MEDIUM STORING PROGRAM FOR EXECUTING THE METHOD

CROSS-REFERENCE TO RELATED PATENT APPLICATION

This application claims the benefit of Japanese Patent Application No. 2005-00372847, filed on Dec. 26, 2005, in the Japanese Patent Office, the disclosure of which is incorporated herein in its entirety by reference.

BACKGROUND OF THE INVENTION

1. Field of the Invention

The present invention relates to an electronic device, a display method thereof, and a storage medium storing a program for executing the method, and more particularly, to an electronic device having a display function which successively displays still pictures, a display method thereof, and a storage medium storing a program for executing the method.

2. Description of the Related Art

Conventional digital still cameras, as disclosed in Japanese Laid-Open Patent Application No. 11-187356, have a display unit consisting of a liquid crystal panel, or similar display panel, for displaying photographed pictures. A user who uses such a digital still camera can successively display a plurality of photographed still pictures in order to check the photographed still pictures. Some digital still cameras have a function of automatically and successively displaying a plurality of pictures for a predetermined time interval. The function is called an "album" function or a "slide show" function. Also, personal computers can successively display a plurality of still pictures.

However, the conventional technique of successively displaying a plurality of still pictures has a number of problems as described below.

The visual function of a human eye has a property called "adaptation." Adaptation refers to how the sensitivity of human eyes changes according to the visual environment. That is, adaptation is a property allowing eyes to accommodate to their surroundings. The adaptation can be expressed as a time function, and takes place sequentially depending on changes in the visual environment.

Of the various adaptation reactions, luminance adaptation is well known. The luminance adaptation is a reaction in which the pigments of light-receiving organs of human eyes decrease while the pupils of the human eyes are dilated in a dark place, thereby allowing him or her to see objects properly with a small amount of light (dark adaptation), and in which the pigments of the light-receiving organs increase while the pupils of the human eyes are constricted in a bright place, thereby allowing him or her to see objects properly with a large amount of light (light adaptation).

Also, among the various adaptation reactions, other than the luminance adaptation, there is contrast adaptation.

In contrast adaptation, a function (a so-called "contrast response function"), representing a relationship between a contrast of a target object and a response of neural cells, is a sigmoid function. The contrast range in which a change in contrast causes a response change in neural cells is very narrow. However, since the visual cortex of the cerebrum moves the contrast range according to the visual environment, contrast sensitivity is maximized under certain visual environmental conditions.

As such, since the visual function of the human eye adapts itself to a visual environment, for example, when a digital still camera displays a still picture and a user continuously views the still picture for a predetermined time, the visual function of the user's eyes adapts itself to the brightness, contrast, etc., of the still picture so that he or she can more easily view the still picture.

If the digital still camera displays a next still picture after adaptation takes place, the user will view the next still picture in the state where a so called "bias" is applied. Accordingly, the picture viewed by the user will appear different from the picture viewed before adaptation takes place.

For example, when a user views a picture of an outdoor scene in bright weather after being subjected to dark adaptation by continuously viewing a picture showing dark night views for a predetermined time, the picture of the outdoor scene appears brighter than when he or she has not been viewing the picture showing the dark night view. On the contrary, when a user views a dark picture after being subjected to light adaptation by viewing a bright picture, the dark picture appears darker than when he or she has not been viewing the bright picture.

Likewise, considering a contrast, for example, when a user views a picture with a low contrast after adapting himself or herself to a picture with a high contrast by viewing the picture with the high contrast for a predetermined time, the picture with the low contrast appears as if it has a contrast lower than when he or she has not been viewing the picture with the high contrast. In some cases, the user cannot recognize the contrast of the picture.

Accordingly, when a plurality of pictures having low spatial correlation to each other are successively displayed for a predetermined time interval, since the visual function of a user's eyes adapts to a previous picture instead of a currently displayed picture, the displayed pictures cannot be recognized as intended by a photographer or a drafter.

Also, if a bright picture and a dark picture are alternately displayed or if a picture with a high contrast and a picture with a low contrast are alternately displayed, a user must adapt himself or herself to the corresponding picture for each alternating period, which may cause fatigue.

SUMMARY OF THE INVENTION

The present invention provides an electronic device which allows a viewer to recognize still pictures as intended by a photographer or drafter, when the still pictures are successively displayed, a display method thereof, and a storage medium storing a program for executing the display method.

According to an aspect of the present invention, there is provided an electronic device including: an estimation unit estimating a level of adaptation of a viewer caused by a first picture displayed; and a picture adjustment unit adjusting a second picture based on the estimated level of adaptation when the second picture is displayed subsequently to the first picture.

When the second picture is displayed, the picture adjustment unit gradually changes the second picture from the adjusted state of the second picture to an unadjusted state of the second picture.

If a n-th picture (n is an integer equal to or greater than 3) is displayed when three or more pictures are successively displayed, the estimation unit predicts a change in adaptation state caused by a (n−1)-th picture, using a state and display time of the (n−1)-th picture, based on a level of adaptation estimated when the (n−1)-th picture is displayed, thereby estimating a level of adaptation when display of the (n−1)-th picture is terminated.

The estimation unit estimates a level of contrast and/or luminance adaptation of the viewer, and the picture adjustment unit adjusts these parameters of the second picture.

The electronic device may be a digital still camera, or a personal computer.

According to another aspect of the present invention, there is provided a display method including: displaying a first picture; estimating a level of adaptation of a viewer caused by the first picture; adjusting a second pictured to be displayed subsequently to the first picture, based on the estimated level of adaptation; and displaying the second picture.

In the displaying of the second picture, the second picture is displayed while gradually changing from the adjusted state of the second picture to an unadjusted state of the second picture.

If a n-th picture (n is an integer equal to or greater than 3) is displayed when three or more pictures are successively displayed, in the estimating of the level of adaptation, a change in adaptation state generated by a (n−1)-th picture is predicted using a state and display time of the (n−1)-th picture, based on a level of adaptation estimated when the (n−1)-th picture is displayed, so that a level of adaptation when the display of the (n−1)-th picture is terminated is estimated.

The estimating of the level of adaptation refers to estimating a level of contrast and/or luminance adaptation of the viewer, and the adjusting of the second picture refers to adjusting these parameters of the second picture.

According to another aspect of the present invention, there is provided a computer readable storage medium storing a program for executing a method including: estimating a level of adaptation of a viewer caused by a first picture after display of the first picture is terminated; and adjusting a second picture to be displayed subsequently to the first picture, based on the estimated level of adaptation.

According to another aspect of the present invention, there is provided a computer readable storage medium storing a program for executing a method including: displaying a first picture; estimating a level of adaptation of a viewer caused by the first picture; adjusting a second picture to be displayed subsequently to the first picture, based on the estimated level of adaptation; and displaying the second picture.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Hereinafter, embodiments of the present invention will be described in detail with reference to the appended drawings.

Figure 1:
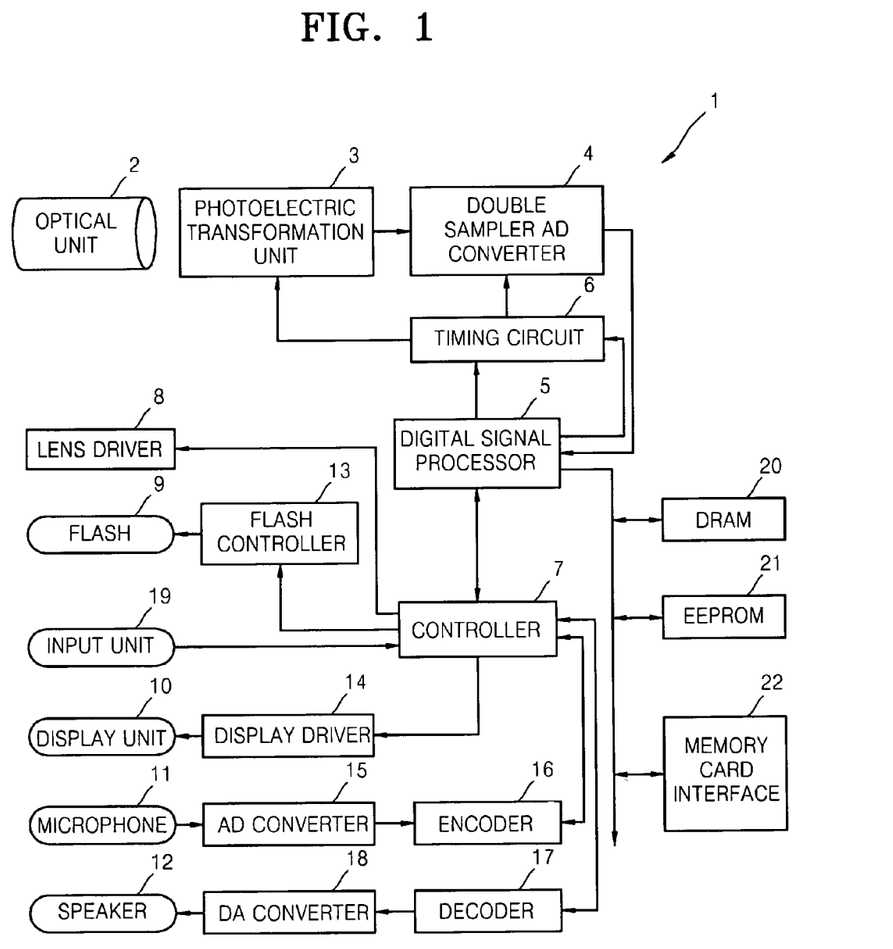
FIG. 1 is a block diagram of a digital still camera according to an embodiment of the present invention.

FIG. 1 is a block diagram of a digital still camera 1 according to an embodiment of the present invention.

The digital still camera 1 has a display function for displaying photographed still pictures and a photographing function, and can successively display the photographed still pictures. In the current embodiment, a user of the digital still camera 1 is a viewer who views the displayed still pictures.

As illustrated in FIG. 1, the digital still camera 1 includes an optical unit 2 including a lens barrel, lens, etc. (not shown), and a photoelectric transformation unit 3.

The optical unit 2 receives light from the outside and condenses the light on the photoelectric transformation unit 3. The photoelectric transformation unit 3 transforms the condensed light into an electrical signal.

The photoelectric transformation unit 3 is, for example, composed of a Charge-Coupled Device (CCD) or a Complementary Metal Oxide Semiconductor (CMOS).

The digital still camera 1 further includes a double sampler analog-to-digital (AD) converter 4, a digital signal processor 5, and a timing circuit 6.

The double sampler AD converter 4 includes two frame memories which can store a signal corresponding to one screen, receives the signal from the photoelectric transformation unit 3, and performs an analog-to-digital conversion on the received signal. Then the double sampler AD converter 4 alternately stores the converted signal in the two frame memories, reads data corresponding to one screen from one of the two frame memories, in which the signal is currently not being recorded, and outputs the read data to the digital signal processor 5.

The digital signal processor 5 processes the digital signal received from the double sampler AD converter 4.

The digital signal processor 5 includes a timer (not shown).

The timing circuit 6 controls the timing operations of the photoelectric transformation unit 3 and the double sampler AD converter 4 on the basis of an instruction received from the digital signal processor 5.

A controller 7 for receiving the data from the digital signal processor 5 and controlling respective components of the digital still camera 1 on the basis of the received data, is also provided.

The controller 7 is, for example, a central processing unit (CPU) and includes a timer (not shown).

The controller 7 controls a lens driver 8 for controlling the position of the lens of the optical unit 2, a flash 9 for oscillating fill light used for photographing, a display unit 10 for displaying a picture, a microphone 11 for converting sound received from the outside into an analog electrical signal, and a speaker 12 for outputting sound to the outside.

The flash 9 is controlled by a flash controller connected to the controller 7 and the display unit 10 is controlled by a display driver 14 also connected to the controller 7. Here, the display unit 10 may consist of a liquid crystal panel, for example.

The digital still camera 1 further includes an AD converter 15 for converting the analog signal received from the microphone 11 into a digital signal, and an encoder 16 for encoding the digital signal received from the AD converter 15 and outputting the result to the controller 7.

The digital still camera 1 further includes a decoder 17 for decoding the encoded digital signal received from the controller 7, and a digital-to-analog (DA) converter 18 for converting the digital signal received from the decoder 17 into an analog signal and outputting the analog signal to a speaker 12.

The digital still camera 1 further includes an input unit 19 for allowing a user to input a variety of commands. The input unit 19 transfers commands input by the user to the controller 7.

Also, a Dynamic Random Access Memory (DRAM) 20, an Electrically Erasable and Programmable Read Only Memory (EEPROM) 21, and a memory card interface 22 are connected to the digital signal processor 5.

Here, the DRAM 20 is a temporary memory used by the digital signal processor 5, the EEPROM 21 is a memory that stores a variety of parameters, etc., and the memory card interface 22 is an interface to a memory card (not shown) which acts as an external memory for storing photographed pictures, when the memory card is installed in the digital still camera 1.

When a plurality of still pictures stored in the memory card are successively displayed on the display unit 10, a user is subjected to luminance adaptation and contrast, adaptation by viewing the currently displayed picture. The controller 7 of the digital still camera 1 estimates the level of the user's luminance adaptation and contrast adaptation.

When the next picture is subsequently displayed, the subsequent picture is adjusted on the basis of the level of adaptation estimated by the digital signal processor 5 and then displayed. While the picture is displayed, the digital signal processor 5 changes the picture gradually from the adjusted state of the picture to the unadjusted state of the picture. The change in the picture is terminated within a predetermined time, e.g., within 30 seconds. Also, as will be described later, the picture adjustment can be performed by the controller 7 instead of the digital signal processor 5.

Hereinafter, an operation of successively displaying the plurality of still pictures stored in the memory card, according to an embodiment of the present invention, will be described. Prior to the description, the adaptation property of human eyes is described.

Figure 2:
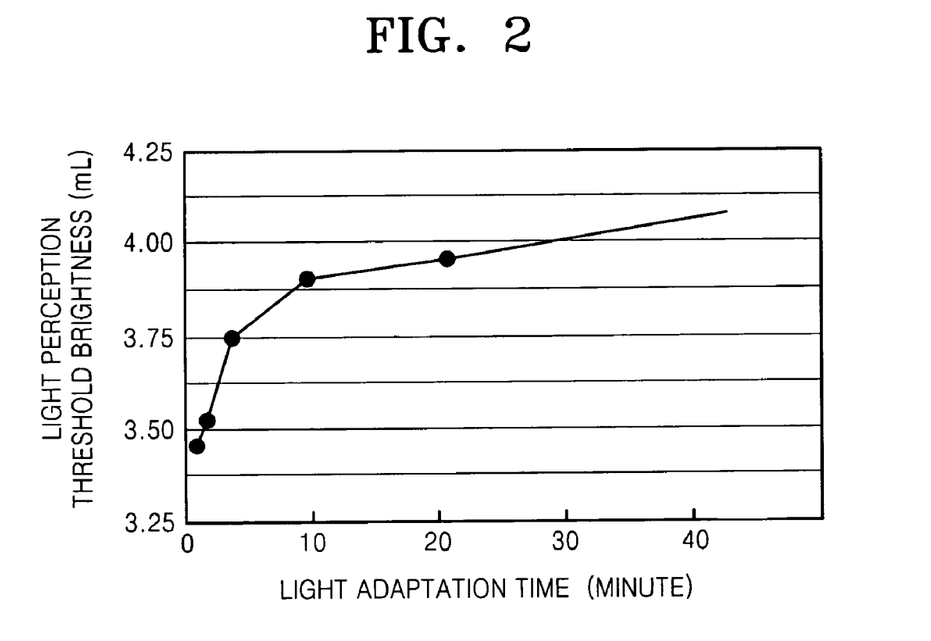
FIG. 2 is a graph plotting a light adaptation reaction in which the horizontal axis is time and the vertical axis is light perception threshold brightness.

FIG. 2 is a graph plotting a light adaptation reaction in which the horizontal axis is time and the vertical axis is light perception threshold brightness. Here, the light perception threshold brightness is the minimum brightness at which a viewer senses the presence of light. The graph is disclosed in a document [illuminating handbook] issued by the Illuminating Engineering Society of Japan.

Figure 3:
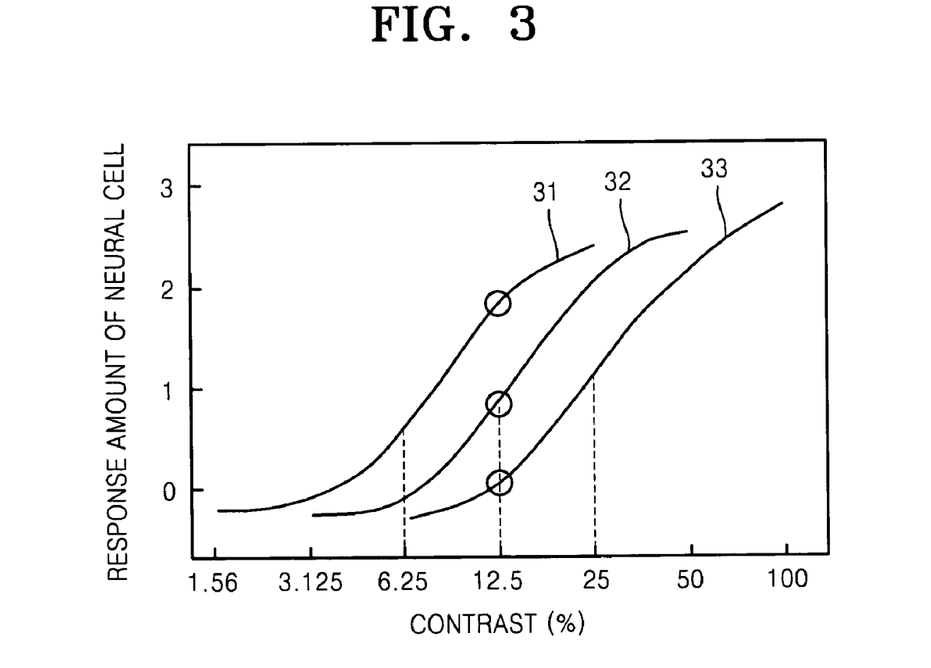
FIG. 3 is a graph plotting a contrast response function in which the horizontal axis is a contrast of a picture and the vertical axis is a level of response of neural cells of the primary, secondary, and trigeminal visual cortexes of the neocortex of the human being.

FIG. 3 is a graph plotting a contrast response function in which the horizontal axis is a contrast of a picture and the vertical axis is a level of response of neural cells of the primary, secondary, and trigeminal visual cortexes of the neocortex of the human being. The graph illustrated in FIG. 3 is disclosed in the home page <http://www.riken.go.jp/r-world/info/release/press/2005/050818/index.html> of the Japanese National Institute for Physical and Chemical Research (RIKEN) (searched on Aug. 19, 2005).

First, luminance adaptation is described.

As illustrated in FIG. 2, when a visual environment varies from a dark state to a bright state, light adaptation rapidly occurs for about 0.2 minutes, then gradually occurs, and is complete within 10 to 15 minutes. Dark adaptation also occurs according to the elapse of time, however, the progress speed of the dark adaptation is slower than that of the light adaptation.

Next, contrast adaptation is described. In FIG. 3, a contrast response function curve 31 corresponds to a case after a viewer views a picture with a contrast of 6.25% for 60 seconds.

The shape of the contrast response function 31 is a sigmoid curve. The slope of the contrast response function 31, that is, the change in the level of response of a neural cell with respect to a change in contrast is at a maximum near a contrast of 6.25%, and the slope of the contrast response function 31 levels off when the contrast is higher or lower than 6.25%. That is, after a viewer views a picture with a contrast of 6.25% for 60 seconds, the viewer's contrast sensitivity is at a maximum near 6.25%.

A contrast response function curve 32 corresponds to a case after a viewer views a picture with a contrast of 12.5% for 60 seconds. The slope of the contrast response function 32 is at a maximum near a contrast of 12.5%.

A contrast response function curve 33 corresponds to a case after a viewer views a picture with a contrast of 25% for 60 seconds. The slope of the contrast response function 33 is at a maximum near a contrast of 25%.

As such, when a viewer continuously views a picture with a predetermined contrast for a predetermined time, a contrast response function curve is moved so that sensitivity at the predetermined contrast is at a maximum. This is a contrast adaptation mechanism. For example, a contrast of 12.5% can be definitely recognized only when the contrast response function is near the contrast response function curve 32. If the contrast response function is near the contrast response function curve 31 or the contrast response function curve 33, the contrast of 12.5% cannot be definitely recognized.

Also, for example, if a viewer views a picture with a contrast of 25% after he or she has viewed a picture with a contrast of 6.25% for a certain length of time, the contrast response function is moved from the contrast response function curve 31 to the contrast response function curve 33 over 60 seconds.

In this manner, it is possible to estimate at what location the contrast response function is at a current time by measuring a length of time in which the viewer continuously views the picture with the contrast of 25%. Then, by adjusting the contrast of a picture to be subsequently displayed so that the contrast is in a range where the slope of the contrast response function varies sharply at that time, the viewer can appropriately view the picture.

Hereinafter, the operation of the digital still camera 1, according to an embodiment of the present invention, will be described in detail.

Figure 4:
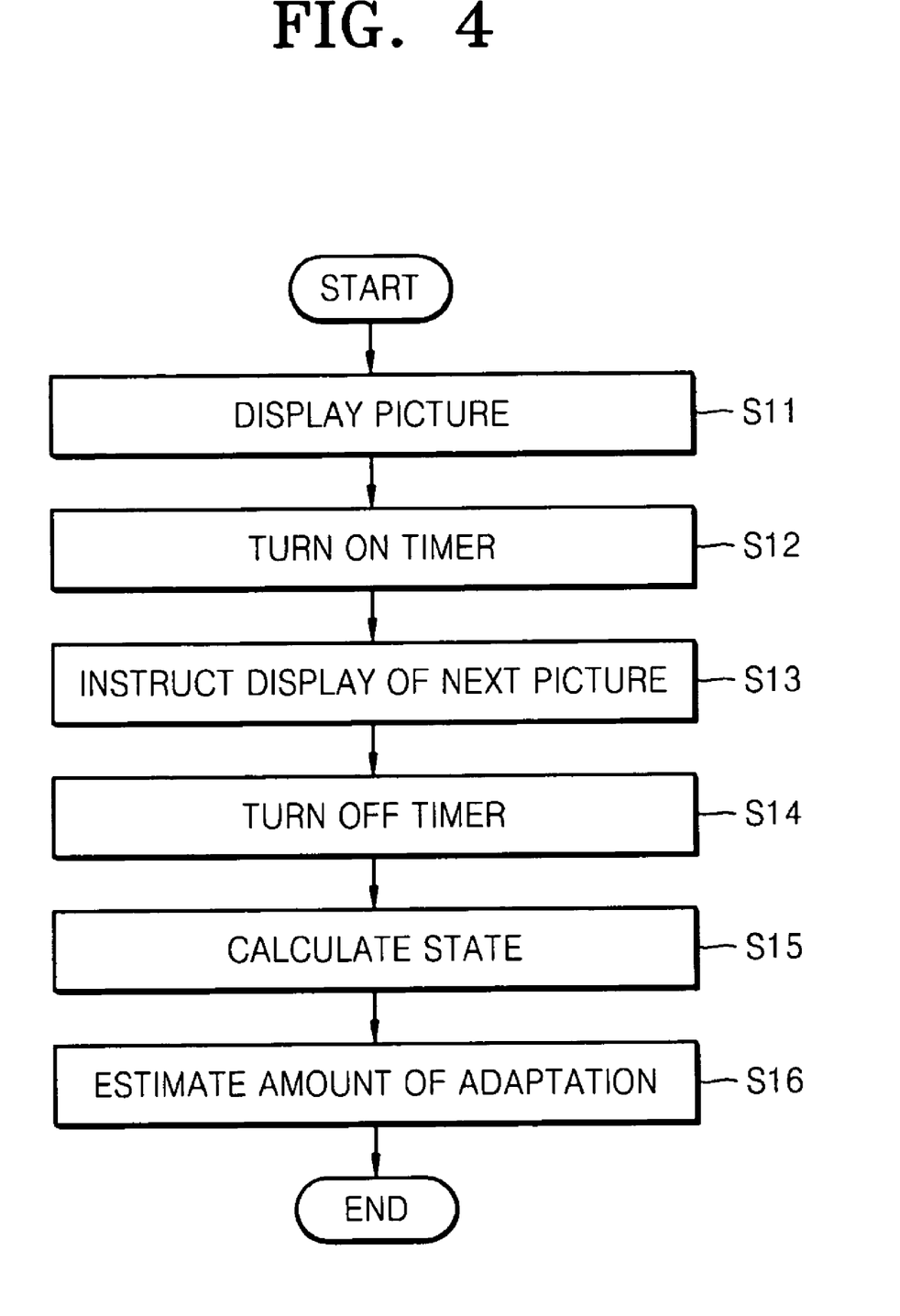
FIG. 4 is a flowchart illustrating a method of estimating an level of adaptation, according to an embodiment of the present invention.
Figure 5:
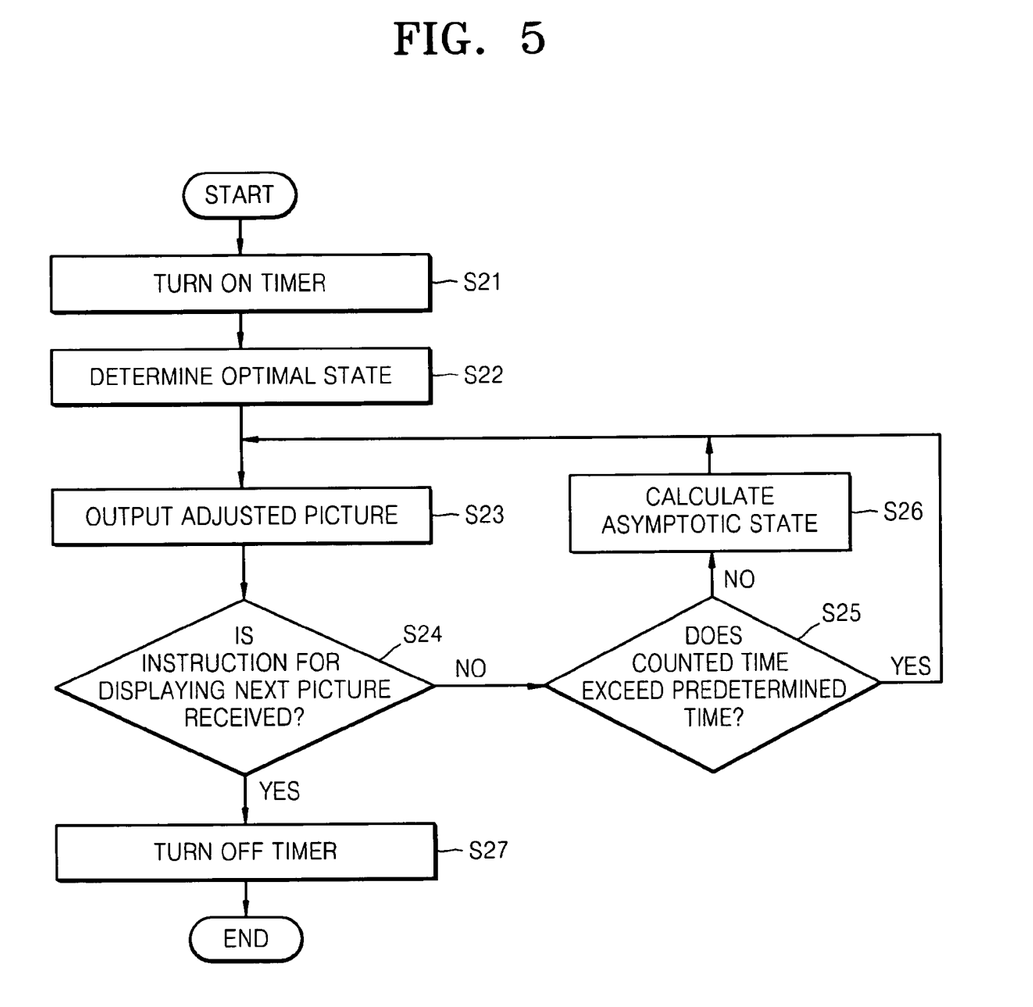
FIG. 5 is a flowchart illustrating a method of adjusting a picture, according to an embodiment of the present invention.

FIG. 4 is a flowchart illustrating a method of estimating a level of adaptation, according to an embodiment of the present invention. FIG. 5 is a flowchart illustrating a method of adjusting a picture, according to an embodiment of the present invention.

In these embodiments, as described above, adaptation estimation is performed by the controller 7 and picture adjustment is performed by the digital signal processor 5.

Referring to FIGS. 1 and 4, if a user inputs a command to display a first picture, to the input unit 19, the command is transferred to the controller 7. Then, in step S11 of FIG. 4, the controller 7 reads a picture stored in the memory card using the memory card interface 22 and the digital signal processor 5 drives the display driver 14, thereby allowing the display unit 10 to display the picture. Then, in step S12, the controller 7 operates the timer.

Next, in step S13, if a command to display a next picture is received from the user through the input unit 19, the controller 7 stops the timer and measures the duration of time for which the first picture was displayed, in step S14.

Then, in step S15, the controller 7 performs state measurement on the first picture and measures the brightness and contrast of the first picture.

Then, in step S16, the controller 7 estimates the level of adaptation that occurred when the user viewed the first picture.

The adaptation estimation can be performed by creating in advance a function representing a relationship between the display time and state of a picture and the level of adaptation and substituting the display time and state of the corresponding picture for the function, or by creating a table representing a relationship between the display time and state of a picture and a level of adaptation and referring the table to the controller. The function or table can be created by plotting the time taken for adaptation of a user and interpolating the plots, when a visual environment of the user varies from a certain state (for example, a dark state) to a different state (for example, a bright state). At this time, a time band in which a change sharply occurs can approximate a straight line.

For the first picture, since the previous adaptation state of the user is not known, adaptation estimation is performed without considering the display time of the first picture. That is, it is assumed that the user adapts himself or herself to the brightness and contrast of the first picture, regardless of the display time of the first picture. Then, the controller 7 outputs the estimated adaptation level to the digital signal processor 5.

Then, in step S21 of FIG. 5, the digital signal processor 5 operates the timer.

Next, in step S22, optimal states of a second picture, that is, an optimal brightness and contrast of a second picture are determined on the basis of the estimated adaptation level result received from the controller 7. For example, in the case when the first picture is bright and has a high contrast and the second picture is dark and has a low contrast, if the second picture is displayed as it is, the second picture appears darker than it should be and as if it has a lower contrast than intended by the photographer. Therefore, it is preferable to increase the brightness of the second picture and raise the contrast of the second picture.

Then, in step S23, the brightness and contrast of the second picture are optimized, according to the optimal states of the second picture, determined in step S22, and the picture data is output to the controller 7.

The controller 7 drives the display driver 14 and allows the display unit 10 to display the picture, as described above in step S11 of FIG. 4. Then, the controller 7 operates the timer, as described above in step S12. As such, when the second picture and/or the subsequent pictures are displayed, the adaptation estimation process of FIG. 4 and the picture adjustment process of FIG. 5 are simultaneously performed.

Then, the digital signal processor 5 performs step S24. In step S24, it is determined whether a command for displaying a next picture is received. If no command for displaying the next picture is received, the process proceeds to step S25. In step S25, it is determined whether a time measured by the timer exceeds a predetermined time, for example, 30 seconds. If the counted time does not exceed the predetermined time, the process proceeds to step S26. In step S26, an asymptotic state is calculated.

The asymptotic state means a transitional state when the state of the second picture and/or the subsequent pictures varies from the optimal state determined in step S22 to the original state of the picture.

That is, if the time measured by the timer is 0 seconds, the picture is displayed with the optimal state determined in step S22. Also, when the measured time reaches the predetermined time, the picture is displayed in its original state without adjustment.

When the counted time is between 0 seconds and the predetermined time, the picture is displayed in the asymptotic state. The asymptotic state is, for example, obtained by linearly interpolating the optimal state and the original state with respect to time. The predetermined time is a time required for changing the picture from the optimal state to the original state and is a time which does not seem incongruous to the user. The predetermined time is decided in advance by a mental experiment. The predetermined time is for example between 10 and 60 seconds, and preferably is 30 seconds.

After the asymptotic state is calculated, the process proceeds to step S23. In step S23, the picture is displayed in the asymptotic state. Then, the process proceeds to step S24. In step S24, it is determined whether a command for displaying a next picture is received. If no command for displaying the next picture is received, the process proceeds to step S25. In step S25, it is determined whether a time measured by the timer exceeds the predetermined time.

If the measured time does not exceed the predetermined time, the process returns to step S26. In this manner, until a command to display a next picture is received or until the measured time exceeds the predetermined time, a loop consisting of steps S23, S24, S25, and S26 is repeatedly executed. Thus, the display state of the picture gradually varies from the optimal state to the original state.

If the measured time exceeds the predetermined time, the process returns to step S23. That is, a loop consisting of steps S23, S24, and S25 is repeatedly executed. Thus, the second picture is continuously displayed in its original state.

Also, if a commend to display a next picture, that is, a command to display a third picture is received, the digital signal processor 5 stops the timer in step S27. Thereafter, the process proceeds to step S15 (see FIG. 4). In step S15, state measurement is performed. Then, the process proceeds to step S16. In step S16, a level of adaptation is estimated.

If the display time of the second picture is short, it is estimated that the adaptation state of the user is in an intermediate state transitioning from an adaptation state generated by the first picture to an adaptation state generated by the second picture. If the display time of the second picture is long, it is estimated that the adaptation state of the user is in the adaptation state generated by the second picture. Accordingly, the adaptation estimation is performed on the basis of the state of the first picture, the state of the second picture, and the display time of the second picture.

Then, the controller 7 outputs the result of the estimated adaptation level to the digital signal processor 5. The digital signal processor 5 determines an optimal state of the third picture on the basis of the estimated adaptation level and adjusts and displays the third picture. Also, the controller 7 asymptotically changes the third picture from the optimal state to its original state.

Also, when a fourth picture is displayed, by estimating a change in the adaptation state generated by the third picture using the state and display time of the third picture, based on the user's adaptation state estimated when the third picture is displayed, a level of adaptation is estimated and an optimal state is determined based on the estimated adaptation level. A fifth picture and subsequent pictures are also processed in the same manner.

The general operation of the current embodiment is described below.

When a plurality of still pictures are successively displayed, a first picture is displayed in its original state. Then, when a second picture is displayed, a level of adaptation is estimated under the assumption that a user completely adapts himself or herself to the first picture, and an optimal state is determined based on the estimated level of adaptation. Then, the second picture is adjusted to the optimal state and then displayed. Then, the second picture gradually changes from the optimal state to its original state in a predetermined time, and after the predetermined time elapses, the second picture is displayed in its original state.

A third picture and subsequent pictures are processed as follows. If n is an integer greater than 3, by estimating a change in adaptation state generated by a (n−1)-th picture by using the state and display time of the (n−1)-th picture, based on a level of adaptation estimated when the (n−1)-th picture is displayed, that is, when the display of a (n−2)-th picture is terminated, a level of adaptation is estimated when the display of the (n−1)-th picture is terminated. Then, an optimal state of an n-th picture is determined based on the level of adaptation, and the n-th picture is adjusted to the optimal state and then displayed. Then, the n-th picture gradually changes from the optimal state to its original state in a predetermined time. After the predetermined time elapses, the n-th picture is displayed in its original state. That is, when the n-th picture is displayed, by estimating a change in adaptation state generated by the (n−1)-th picture using the state and display time of the (n−1)-th picture, based on the level of adaptation estimated when the (n−1)-th picture is displayed, that is, when the display of the (n−2)-th picture is terminated, a level of adaptation when the display of the (n−1)-th picture is terminated is estimated. Then, an optimal state of the n-th picture is determined based on the level of adaptation and the n-th picture is adjusted to the optimal state and then displayed. Thereafter, the n-th picture gradually changes from the optimal state to its original state in a predetermined time. After the predetermined time elapses, the n-th picture is displayed in its original state.

Hereinafter, effects of the current embodiment will be described.

According to the current embodiment, when a plurality of still pictures are successively displayed, by estimating a user's adaptation state due to viewing the previously displayed picture and adjusting a picture to be subsequently displayed based on the estimated adaptation state, it is possible to allow a user to view the still pictures according to the intention of a photographer or drafter of the still pictures.

Also, since a picture is adjusted according a user's adaptation state, a change in a user's visual environment can slow down. Therefore, since a complete change between pictures does not require much user adaptation, the user's load can be reduced. Therefore, the user can view pictures without experiencing fatigue.

Also, in the current embodiment, an example in which picture conversion is performed according to a user's instruction is described, however, the present invention is not limited to this. It is possible that picture conversion is automatically performed by a program, etc.

Also, in the current embodiment, luminance adaptation and contrast adaptation from among a variety of adaptation types are considered, however, the present invention is not limited to these. For example, one of luminance adaptation and contrast adaptation can be considered, or different adaptation types, such as color adaptation, etc., can be considered.

Also, in the current embodiment, an example in which the controller 7 estimates a level of adaptation and the digital signal processor 5 performs picture adjustment, is described, however, the present invention is not limited to this. That is, it is possible that the controller 7 can perform a part of or the entire picture adjustment.

Figure 6:
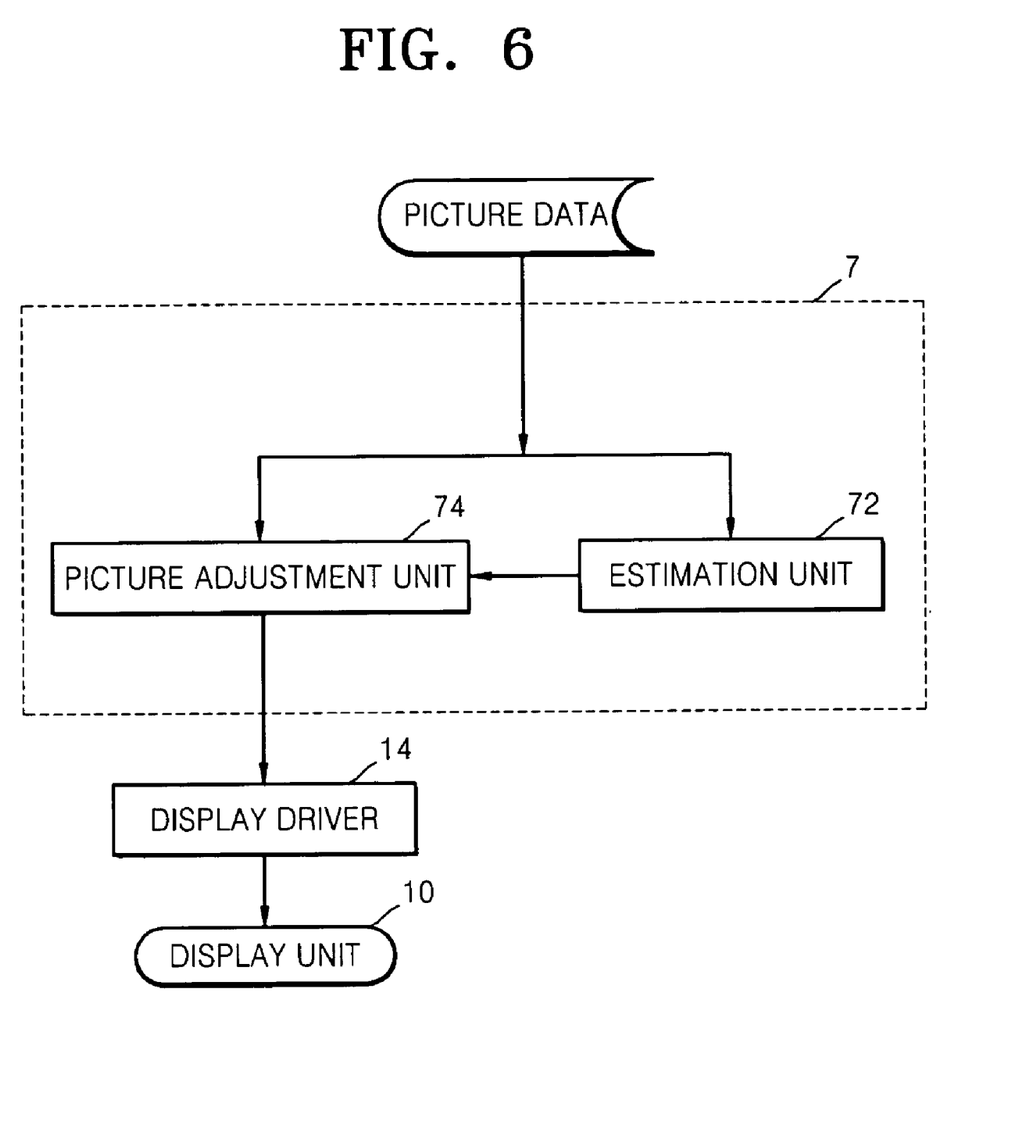
FIG. 6 is a block diagram showing a part of a control unit of a digital still camera, according to another embodiment of the present invention.

FIG. 6 is a block diagram showing a part of a controller 7 of the digital still camera 1 of FIG. 1, according to another embodiment of the present invention.

In the current embodiment, the controller 7 includes an estimation unit 72 and a picture adjustment unit 74. Picture data to be displayed is supplied to the estimation unit 72 and the picture adjustment unit 74. Alternatively, it is also possible that picture data can be supplied to the picture adjustment unit 74 through the estimation unit 72. Also, the estimation unit 72 and the picture adjustment unit 74 can be implemented as hardware in an exclusive circuit, or can be implemented as software by a predetermined program in a CPU.

The estimation unit 72 estimates a level of adaptation of a user viewing the picture, based on the supplied picture data. In detail, the estimation unit 72 measures the brightness and contrast of the picture, for example, based on the supplied picture data, and estimates the user's adaptation level.

Then, the estimation unit 72 outputs the estimation result to the picture adjustment unit 74. The picture adjustment unit 74 adjusts parameters of the brightness or contrast, etc. of a picture to be subsequently displayed, based on the estimation result supplied from the estimation unit 72. Picture data adjusted in this manner is output to the display driver 14 and is displayed on the display unit 10.

According to the current embodiment, when a plurality of still pictures are successively displayed, the controller 7 estimates a user's adaptation state due to viewing the previously displayed picture and adjusts a picture to be subsequently displayed according to the estimation result. In this manner, it is possible to allow a user to view pictures according to the intention of a photographer or drafter of the pictures.

Also, in the current embodiment, an example in which the present invention is applied to a digital still camera is described, however, the present invention is not limited to this. That is, the present invention can be applied to any electronic device which is capable of successively displaying a plurality of pictures. For example, the electronic device may be a personal computer. In this case, displayed pictures are not limited to still pictures and may be drawings composed of figures, letters, etc.

Or, the electronic device according to the present invention may be a storage unit which is capable of storing pictures photographed by a digital still camera. Also, the present invention can be applied to digital video cameras, video players, Digital Versatile Disc (DVD) players, television receivers, etc., that are capable of successively reproducing still pictures.

Also, adaptation estimation and picture adjustment can be performed using hardware, or can be performed using software, that is, can be performed by a program. Here, the program is for executing a process of estimating a level of adaptation of a viewer caused by a first picture after display of the first picture is terminated on the screen of a computer, and a process of adjusting a second picture to be displayed subsequently to the first picture based on the estimated level of adaptation, when picture conversion is performed manually or by a different program. The program can be recorded and executed in a storage medium, such as a hard disc, RAM, ROM, etc.

Also, when picture conversion is performed automatically by the same program, the program is for executing a process of displaying a first picture on the screen of a computer, a process of estimating a level of adaptation of a viewer caused by the first picture, a process of adjusting a second picture to be displayed subsequently to the first picture based on the estimated level of adaptation, and a process of displaying the second picture. The program can be recorded and executed in a storage medium, such as a hard disc, RAM, ROM, etc. The term "computer" is not limited to a personal computer and includes all programmable electronic circuits. For example, an electronic device processor, such as a digital still camera, etc., is included in the term "computer", As described above, according to the present invention, there are provided a electronic device, a display method thereof, and a storage medium storing a program for executing the method, which allow a user to recognize still pictures according to the intention of a photographer or drafter of the still pictures when the still pictures are successively displayed, thereby reducing user fatigue.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An electronic device reproducing still pictures stored in a memory device, the electronic device comprising:
    an estimation unit estimating a level of adaptation of a viewer caused by at least a display time of a first picture displayed; and
    a picture adjustment unit that adjusts at least one of contrast and brightness of a second picture based on the estimated level of adaptation when the second picture is displayed subsequently to the first picture, wherein, when the second picture is displayed, the picture adjustment unit gradually changes the second picture from the adjusted state of the second picture to an unadjusted state of the second picture.

2. The electronic device of claim 1, wherein, if a n-th picture (n is an integer equal to or greater than 3) is displayed when three or more pictures are successively displayed, the estimation unit predicts a change in adaptation state caused by a (n−1)-th picture, using a state and display time of the (n−1)-th picture, based on a level of adaptation estimated when the (n−1)-th picture is displayed, thereby estimating a level of adaptation when display of the (n−1)-th picture is terminated.

3. The electronic device of claim 1, wherein the estimation unit estimates a level of contrast adaptation of the viewer.

4. The electronic device of claim 1, wherein the estimation unit estimates a level of luminance adaptation of the viewer.

5. The electronic device of claim 1, wherein the estimation unit estimates levels of contrast adaptation and luminance adaptation of the viewer.

6. The electronic device of claim 1, where the electronic device is a digital still camera.

7. The electronic device of claim 1, where the electronic device is a personal computer.

8. A display method for reproducing still pictures stored in a memory device comprising:
    displaying a first picture;
    estimating a level of adaptation of a viewer caused by the first picture based at least on the time the first picture is displayed;
    adjusting at least one of contrast and brightness of a second picture based on the estimated level of adaptation; and
    displaying the adjusted second picture subsequently to the first picture, wherein, in the displaying of the second picture, the second picture is displayed while gradually changing from the adjusted state of the second picture to an unadjusted state of the second picture.

9. The display method of claim 8, wherein, if a n-th picture (n is an integer equal to or greater than 3) is displayed when three or more pictures are successively displayed, in the estimating of the level of adaptation, a change in adaptation state generated by a (n−1)-th picture is predicted using a state and display time of the (n−1)-th picture, based on a level of adaptation estimated when the (n-1)-th picture is displayed, so that a level of adaptation when the display of the (n−1)-th picture is terminated is estimated.

10. The display method of claim 8, wherein the estimating of the level of adaptation refers to estimating a level of contrast adaptation of the viewer.

11. The display method of claim 8, wherein the estimating of the level of adaptation refers to estimating a level of luminance adaptation of the viewer.

12. The display method of claim 8, wherein the estimating of the level of adaptation refers to estimating levels of contrast adaptation and luminance adaptation of the viewer.

13. A physical computer readable storage medium storing a program for executing a method for reproducing still pictures stored in a memory device comprising:
    displaying a first picture;
    estimating a level of adaptation of a viewer caused by the first picture based at least on the time the first picture is displayed;
    adjusting at least one of contrast and brightness of a second picture based on the estimated level of adaptation; and
    displaying the adjusted second picture subsequently to the first picture, wherein, in the displaying of the adjusted second picture, the adjusted second picture is displayed while gradually changing from the adjusted state of the second picture to an unadjusted state of the second picture.

* * * * *